3,816,386
PURIFICATION PROCESS FOR GN-RH
Marc Theodore Hedlund, Waukegan, and Wilfrid Francis White, Arlington Heights, Ill., assignors to Abbott Laboratories, Chicago, Ill.
No Drawing. Filed June 20, 1972, Ser. No. 264,657
Int. Cl. C07c 103/52; C07g 7/00
U.S. Cl. 260—112.5
5 Claims

ABSTRACT OF THE DISCLOSURE

The present invention is directed to the preparation of Gn-RH from its precursor, the polyprotected decapeptide p-Glu-His-Trp-Ser-Tyr-Gly-Leu-Arg-Pro-Gly-NH$_2$ to obtain Gn-RH in a purity of 95% or better. The new procedure essentially includes two chromatographic steps in addition to the previously known deprotecting method.

DETAILED DESCRIPTION OF THE INVENTION

A number of previous publications have shown general methods for making the gonadotropin-releasing hormone (Gn-RH). Essentially, these references deal with the gradual build-up of the decapeptide chain by classical (solution) method or by the solid-phase (Merrifield) method. In all instances, some of the amino acids included in the chain need to be protected at the potentially reactive sites other than the α-amino group. This results in a decapeptide chain of the desired amino acid sequence still carrying a variety of protective groups and frequently a variety of other peptide chains due to incomplete coupling reactions. These latter peptides possess no Gn-RH activity but have physico-chemical properties so similar to Gn-RH that their elimination is most difficult.

The protective groups mentioned above can easily be eliminated by a simple chemical treatment such as the room temperature treatment of the polyprotected decapeptide with hydrogen fluoride, for instance, the method described by Sakakibara, et al., Bull. Chem. Soc. Japan 38, 1412 (1965). Elimination of excess hydrogen fluoride produces the desired unprotected decapeptide. Unfortunately, this material usually is obtained in a purity of only about 20% or less, because of the above mentioned other (shorter) peptides of otherwise similar chemical structure. Material of this nature is extremely difficult to purify because of the nature of the impurities. The best methods developed so far eliminate only part of the impurities, leaving a Gn-RH material of only 60–80% of the potency of a biologically pure material, even when purified through numerous passages of a solution thereof through chromatographic columns.

It is therefore an object of the present invention to provide a purification process for Gn-RH; it is a particular object of the present invention to provide a process for making pure Gn-RH from the crude polyprotected decapeptide precursor; it is still a further object of the present invention to provide a method for making Gn-RH of at least 95% purity from its precursor by a simple, commercially feasible process.

These and other objects are accomplished by passing a solution of the crude decapeptide p-Glu-His-Trp-Ser-Tyr-Gly-Leu-Arg-Pro-Gly-NH$_2$, wherein all optically active aminoacids are present in the L-form, and which is obtained by removing the protective groups from the corresponding purified polyprotected decapeptide with hydrogen fluoride first through a column packed with a partially cross-linked dextran gel having affinity for molecular weights of 1000–2000 and subsequently through a second column packed with a similar partially cross-linked dextran gel having affinity for molecular weights below 1500. In a preferred embodiment, the above crude decapeptide is obtained from the previously described polyprotected decapeptide L-p-Glu-L-(N$^{Im}$-R°)His - L- Trp-L-(O-R)-Ser-L-(O-R')Tyr-Gly-Leu-L-(N$^\omega$ - R'')Arg-L-Pro-Gly-NH$_2$ wherein R°, R, R' and R'' are protective groups that are removed with hydrogen fluoride and R° additionally may be hydrogen by passing a solution thereof through a column packed with silica gel prior to removing said protective groups through treatment with hydrogen fluoride by known procedures.

It has been found that in order to obtain a biologically pure Gn-RH from the corresponding polyprotected decapeptide precursor, the two-column dextran passage as well as the pre-purification of the precursor are necessary; elimination of any of the steps produces a peptide that has only an insufficient biological titer for medicinal application of the resulting material. For instance, when the crude polyprotected precursor is treated with hydrogen fluoride without any pre-purification and no further chromatographic purification is carried out, the resulting Gn-RH has a potency of only 12–20% of the potency of a chemically pure material; if the first of the above dextran gel columns is left out of the purification procedure shown above, a potency of only 90% is obtained while the best available Gn-RH material obtained through purification steps other than the above dextran gel columns has a purity of only 82–85%. The procedure according to the present process consistently produces Gn-RH of above 95% purity.

In a general embodiment of the present process, a polyprotected decapeptide with the amino acid sequence of Gn-RH and carrying protective groups that are removable with hydrogen fluoride at Arg, Ser, Tyr and optionally at His is pre-purified by dissolving it in a suitable non-aqueous solvent or solvent mixture and passed through a silica gel column in order to separate some of the impurities contained in the solution. After evaporation of the solvent, the purified polyprotected decapeptide is then placed in a HF-resistant reaction vessel and treated with hydrogen fluoride in the presence of an aromatic liquid that acts as an absorber for the protective groups that are split from the decapeptide in this step. The deprotected decapeptide is then removed from the liquid phase, placed in a suitable solvent or solvent mixture and placed on a gel filtration column that eliminates peptides of molecular weights outside of the range of 1000–2000. A second gel filtration through a column eliminating peptides of molecular weights below 1500 is then carried out. After removing the decapeptide from the eluant, it is virtually pure, showing only a single spot on thin-layer chromatographic plates.

The gel filtration packing used for the deprotected decapeptide is preferably a partially cross-linked dextran gel. Gels of this type are commercially available from various sources. Particularly suitable are the Sephadex gels (marketed by Pharmacia of Uppsala, Sweden) which are available in various grades of coarseness and various properties designed to separate specified molecular weight ranges. The Sephadex material with the suitable affinity for the first of the above columns is sold under the designation Sephadex G–25; Sephadex packing fulfilling the requirements for the second column is marketed as Sephadex G–15. In all instances, the bead size of the dextran gel particles may be between 10 and 300μ, preferably in the range of 20–150μ. With smaller bead sizes, flow of the solution through the column is unduly slow while above a bead size of 150μ, the separation of the specified molecular weight range is not effective enough to produce reproducible results with a single passage of the solution over each of the specified columns.

In order to illustrate the process of the present invention, reference is made to the following example which, however, is not intended to be interpreted in any respect to limit the invention.

EXAMPLE

The decapeptide chain L-p-Gly-L-His-L-Trp-L-Ser-L-Tyr-Gly-L-Leu-L-Arg-L-Pro-Gly-NH$_2$ carrying a benzyl group at each of the Ser and Tyr O-functions and a nitro-group at N$^\omega$ of Arg was prepared by the stepwise amino acid addition method described by Merrifield (Stuart & Young, Solid Phase Peptide Synthesis, published by W. H. Freeman & Co., in 1969). The decapeptide was then removed from the resin substrate by the conventional method as follows:

The triprotected decapeptide resin ester was slurried in 1200 ml. of dimethylformamide/methanol 1:1 and while the suspension was cooled in an ice-bath, it was saturated with gaseous ammonia. After stirring the suspension subsequently for 24 hours at room temperature, it was resaturated with ammonia under cooling and stirred for an additional 4 hours. The slurry was filtered, washed with dimethylformamide and the filtrate was concentrated in vacuo, using a bath temperature of below 45° C. A crude oil of about 30 g. was obtained; it was dissolved in enough glacial acetic acid to produce a water-like viscosity.

A chromatographic column with a bed size of 5 x 75 cm. packed with 0.05–0.2 mm. (70–325 mesh ASTM) diameter particles of silica gel was prepared using chloroform/methanol 19:1 as the packing medium. The above acetic acid solution of the triprotected decapeptide was placed on this column followed by washing it with 2000 ml. of a chloroform/methanol (19:1) mixture. The peptide was then eluted with chloroform/methanol 2:1. After evaporation of the solvent from the combined fractions containing the decapeptide, the above procedure was repeated on a silica gel column of about half the noted size. The obtained material was then crystallized by dissolving the solid material in a minimum of hot methanol and cooling, yielding 8.2924 g. of the pure triprotected decapeptide which has a specific rotation $[\alpha]_D^{25}$ —23.7° (c.=1, 1% acetic acid). A second crop of 0.3347 g. was obtained from the methanol filtrate.

The purified, triprotected decapeptide was treated in a HF-resistant apparatus consisting of three vessels placed in series: the first vessel is a collection vessel containing cobalt fluoride; it connects with a reaction vessel which also carries an inlet tube for the peptide that is to be deprotected. The outlet tube connects with a water trap from where the outlet leads to the sink. The whole series of vessels is sealed except for the inlet leading into the collection vessel and, of course, the terminal outlet.

The system was first flushed with dry nitrogen gas followed by the introduction of hydrogen fluoride until 12 ml. were collected in the collection vessel which was cooled by a Dry Ice-acetone bath. The cooling bath was then switched to the reaction vessel and 500 mg. of the above first crop of triprotected decapeptide in 1.0 ml. of anisole was placed in this vessel. A hot water bath was placed under the collection bath to distill the hydrogen fluoride from there into the reaction vessel. When 10 ml. of hydrogen fluoride had been collected in the reaction vessel, the Dry Ice-acetone cooling bath was replaced by an ice bath and the mixture was magnetically stirred for one hour. The ice bath was removed and the system was flushed again with nitrogen until all hydrogen fluoride had been removed.

The deprotected decapeptide in the reaction vessel was precipitated by the addition of 15 ml. of dry ether. The collected solid was dissolved in water/acetic acid 9:1, washed with ether and the resulting solution was lyophilized and dried overnight over P$_2$O$_5$/KOH at 0.2 mm. Hg pressure. A solution of this material in 0.1 N aqueous acetic acid was filtered through a millipore filter (0.65μ; 47 mm.) and relyophilized to yield 0.443 g. of the crude hormone Gn-RH.

A solution of 1.9 g. of the hormonal material obtained in this fashion in 40 ml. of 0.1 molar acetic acid was placed on a chromatographic column of 8.9 cm. internal diameter packed to a height of 110 cm. with Sephadex G–25. The flow rate of this column was set at 750 ml./hr. and elution was carried out with 0.1 molar acetic acid. The initial 4000 ml. of eluant did not contain any measurable amount of the desired decapeptide. Subsequent elution was done in 20 ml. fractions. The pooled fractions containing the desired hormone was rechromatographed in the above fashion using Sephadex G–15 as the packing.

After evaporating the solvent from the pooled fractions containing Gn-RH, the residue was lyophilized from a dilute acetic acid solution. The material so obtained represented the desired Gn-RH decapeptide in a purity of 98% as determined by biological assays. Chemical analysis confirms the decapeptide to contain 2 moles of acetic acid and 4 moles of water per mole of Gn-RH. Elemental analysis shows 51.68% C, 6.25% H, 17.00% N and 25.25% O (calculated values for the diacetate tetrahydrate are 51.56% C, 6.67% H, 17.32% N and 24.44% O). The optical rotation was $[\alpha]_D^{25}$—50.5° (c.=1; 1% acetic acid).

The significance of the above purification method can be shown in a drastic fashion by reference to the yields at various stages of the new method. The yields below are expressed in grams of material per millimole of starting glycine resin ester (glycine based on amino acid analysis following hydrolysis). The crude, cleaved, triprotected decapeptide yield was 1.69 g./mM.; the silica gel purification reduced this value to 0.49 g./mM. After deprotecting, the yield of the crude material was 0.44 g./mM.; the first Sephadex column reduced this to 0.22 g./mM. and the final step reduced this further to 0.14 g./mM. Although these numbers are based on a g./mM. glycine-resin which is of no significance after removal of the peptide chain from the resin, the numbers clearly show the progress of the new purification method.

As mentioned above, a partial pre-purification and the two-step chromatographic purification following the deprotecting reaction are absolutely essential in order to obtain a biologically useful material from polyprotected Gn-RH. This necessity arises because of contamination of the assembled decapeptide with other peptides due to incomplete coupling reactions during the chain assembling sequence and the lability of the histidine moiety that is part of this sequence. These impurities occur whether the peptide is assembled by solution or solid-state methods.

While the new method is shown above in its efficiency with a triprotected decapeptide, the same results are obtained when the decapeptide also carries a protective group at the N$^{Im}$-position of His. Any of the protective groups reported previously by Schröder et al. (The Peptides I, Academic Press 1965, Pages 167–174, 210–2 and 222–5) may be part of the decapeptide used as the starting material for the new purification method, provided that the protective groups will be cleaved by the standard HF-treatment referred to above.

While other gel filtration methods have previously been used in peptide purifications, the new method is unique in the particular selection of the packing materials defined above. Only the use of two columns with different packings, the described sequence of the columns and the use of a prepurified polyprotected precursor assures a biologically acceptable end product. The new process is not only simple, practical and inexpensive because of re-usability of the dextran columns, it also is reproducible with a high degree of accuracy. Other methods suggested in the past are usually quite complicated and/or unsuitable for large scale batches while producing material that is of insufficient purity for medicinal use and/or yielding a final material that greatly varies from batch to batch in purity.

The dextran columns used are three-dimensional networks of polysaccharide chains with different degrees of cross-linking. The network has non-ionic characteristics and the polar properties are almost entirely due to the high content of hydroxyl groups. A high degree of cross-linking produces a more compact structure while lower degrees of cross-linking produces a more porous structure. The gel swells in all aqueous solutions with different degrees of water regain. The first dextran gel column is cross-linked to a water regain of 2.5 ml./g. while the second column contains a gel cross-linked to a water regain of 1.5 ml./g. The dextran gels preferred for use in the present process are cross-linked with epichlorohydrin. However, other cross-linked gels of the type described in U.S. 3,042,667 can be advantageously substituted therefor with good results.

The preferred solvent for passing the Gn-RH through the dextran gel columns is dilute acetic acid, although other aqueous acids could also be used. Acetic acid has the advantage of being volatile and any excess thereof can easily be removed. A practical range for its concentration is 0.02–1.0 molar while a preferred concentration is about 0.1 molar. The concentration of the peptide for passing it through the gel filtration columns is conveniently selected between 2 and 10% weight/volume with an optimum range of 4–6% weight/volume. After the deprotecting step, the above example shows lyophilization, a step which was repeated after the first passage through the gel column. These steps are used only to remove the solvent and are of no significance for obtaining a purer product. Other methods such as solvent evaporation may be used in place of lyophilization.

We claim:

1. A process of preparing biologically pure Gn-RH consisting essentially in passing a solution of the crude decapeptide L-p-Glu-L-His-L-Trp-L-Ser-L-Tyr-Gly-L-Leu-L-Arg-L-Pro-Gly-$NH_2$ obtained by removing the protective groups of the corresponding purified polyprotected decapeptide with hydrogen fluoride first through a column packed with a partially cross-linked dextran gel having affinity for molecular weights of 1000–2000 and subsequently through a second column packed with a partially cross-linked dextran gel having affinity for molecular weights below 1500.

2. The process of claim 1 wherein said crude decapeptide is obtained from the protected decapeptide p-Glu-($N^{Im}$-R°)His - Trp - (O-R)Ser - (O-R')Tyr - Gly - Leu-($N^{\omega}$-R'')Arg-Pro-Gly-$NH_2$ wherein R°, R, R' and R'' are protective groups that are removed by treatment with hydrogen fluoride and R° additionally may be hydrogen by passing a solution of said protected decapeptide through a silica gel column prior to removal of the protective groups R°, R, R' and R'' with hydrogen fluoride.

3. The process of claim 1 wherein said solution of the crude decapeptide is an acetic acid solution of 0.02–1.0 molarity of acetic acid.

4. The process of claim 3 wherein said acetic acid is used in a molarity of 0.1.

5. The process of claim 1 wherein said dextran gels are cross-linked with epichlorohydrin.

References Cited

Monahan et al.: C. R. Acad. Sc. Paris, 273, 508 (1971).
Determan: Angew. Chem. Internat. Ed., 3, 608 (1964).
Sakakibara et al.: Bull. Chem. Soc. Japan, 38, 1412 (1965).

LEWIS GOTTS, Primary Examiner

R. J. SUYAT, Assistant Examiner